UNITED STATES PATENT OFFICE.

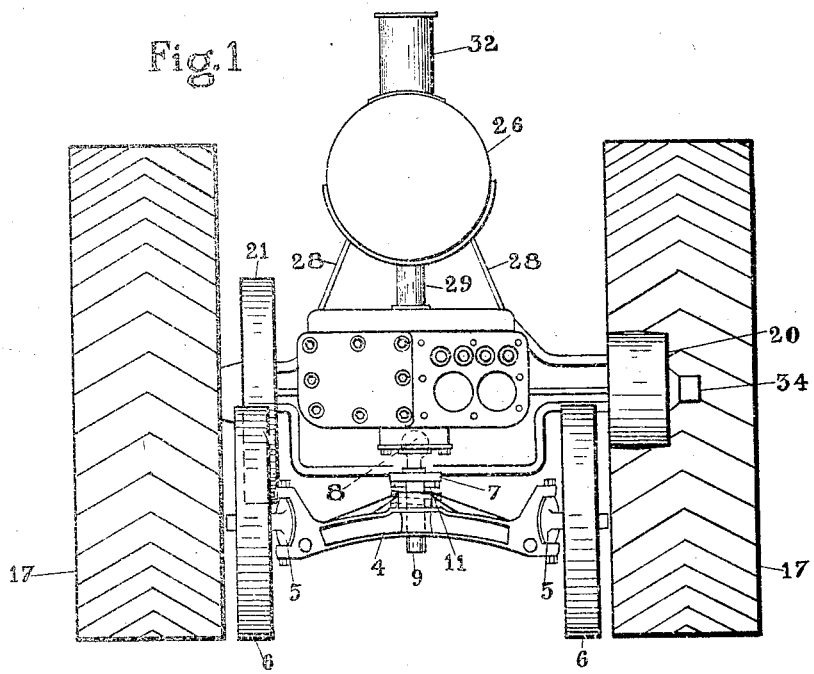
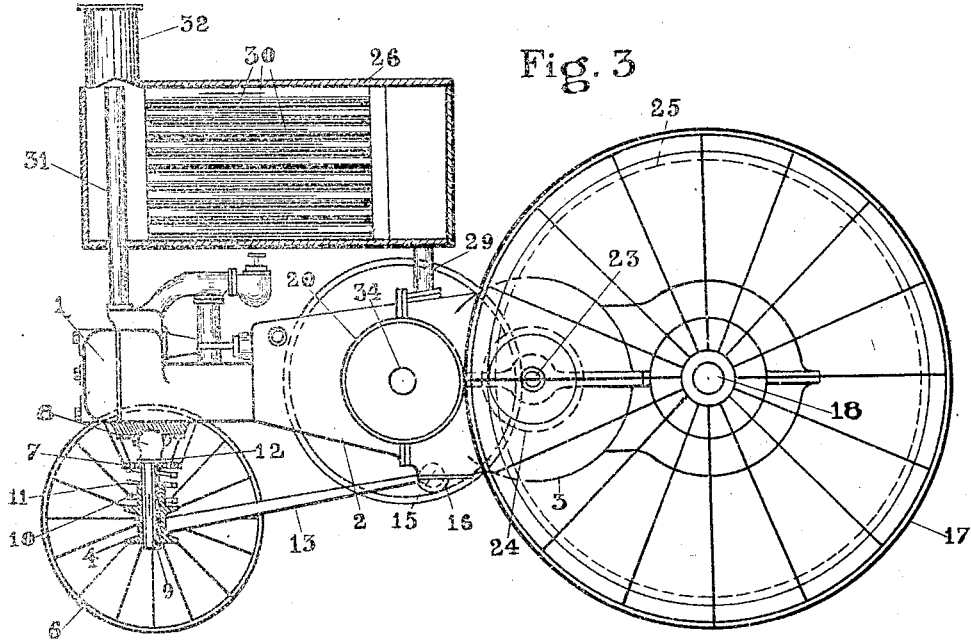

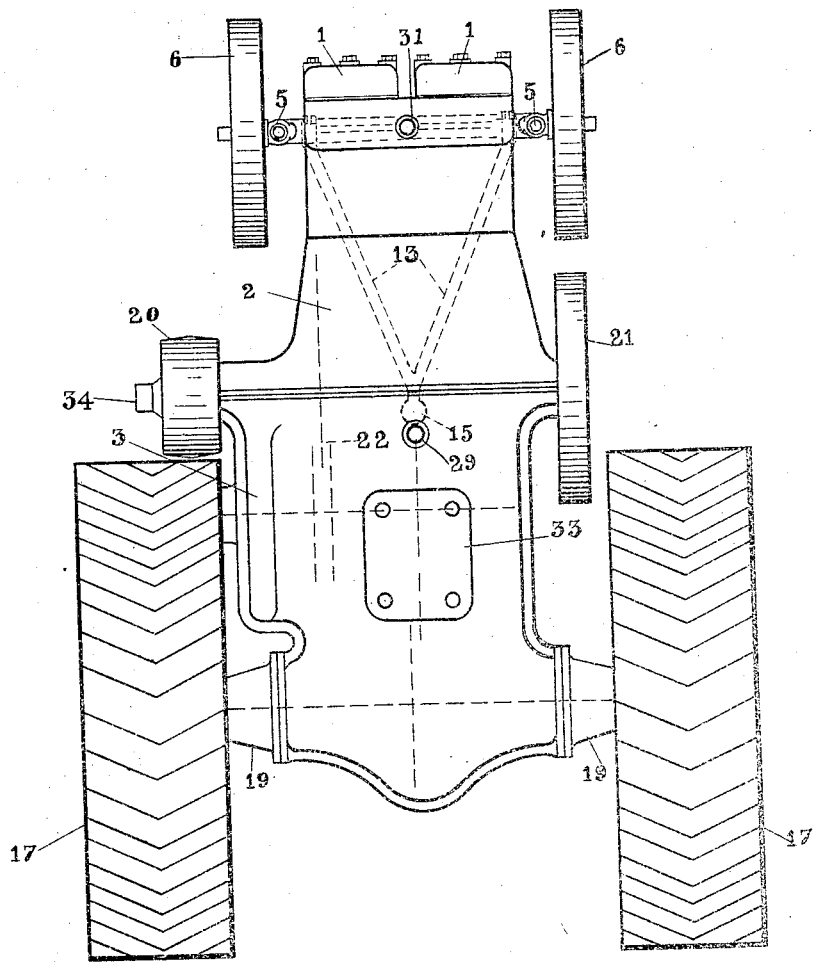

HENRY FORD, OF DETROIT, MICHIGAN.

TRACTION-ENGINE.

1,036,480.　　　　Specification of Letters Patent.　Patented Aug. 20, 1912.

Application filed May 24, 1909. Serial No. 497,869.

*To all whom it may concern:*

Be it known that I, HENRY FORD, a citizen of the United States of America, residing at Detroit, in the county of Wayne and State of Michigan, have invented certain new and useful Improvements in Traction-Engines, of which the following is a specification, reference being had therein to the accompanying drawings.

This invention relates to traction engines of the internal combustion type, and to certain arrangement and disposition of parts whereby strength and simplicity of construction are obtained.

The invention consists in the matters hereinafter set forth and more particularly pointed out in the appended claims.

Referring to the drawings, Figure 1 is a view in front elevation, partly diagrammatic, of an engine embodying features of the invention. Fig. 2 is a plan view thereof. Fig. 3 is a view partly in section and partly in side elevation.

In the drawings, an explosive engine of any suitable standard design, is disposed with its cylinder or, preferably, cylinders 1 horizontally arranged with crank case 2 formed or secured on the inner ends thereof, and a closed transmission gear housing 3 extending therefrom, the cylinders, casing and housing constituting a very rigid, horizontal, substantially integral or one-piece frame.

The forward or cylinder end of the frame is supported on a front axle 4 having steering knuckles 5 on which bearing wheels 6 are journaled. As a preferred construction, a bearing plate 7 on the underside of the cylinders forms a ball-and-socket connection with the spherical head 8 of a kingpin 9 that is longitudinally reciprocable in a sleeve 10 of the axle 4, a spring 11 that encircles the sleeve and on which the plate 7 rests, affording a yielding or cushioning support. The axle is held from horizontal angular deflection by a pair of divergent radius rods 13, whose outer ends are secured to the outer portions of the axle and whose inner ends are united by a yoke having a spherical head 15 forming a ball-and-socket connection with a thrust block 16 on the engine frame some distance back of the axle. This arrangement gives an effective three-point support to the engine and allows the front wheels to freely follow irregularities in the road surface without racking the engine body.

A pair of traction wheels 17 of standard type are secured on a driving shaft 18 journaled in bearing brackets 19 that are preferably tubular and extend laterally from the rear portion of the transmission housing or engine frame.

The main shaft 34 of the engine, which extends on either side through the engine frame or crank case and carries a belt wheel 20 and balance wheel 21 for use in driving a threshing machine or for like purpose, is connected to the traction wheels or their shaft by any preferred form of transmission mechanism, as, for example, a back train of spur gearing between the driving gear and engine shaft, indicated diagrammatically by the dotted lines at 22, change speed being afforded by a jack-shaft 23 whose extended end carries a pinion 24 in mesh with an interior gear 25 on one of the tractor wheels. This transmission and reversing means does not, *per se*, form a part of the invention, and the means for manually controlling this are not indicated, any standard method for connecting a drive and follower shaft being suitable. The steering mechanism for the forward wheels is also of any preferred form, and is not indicated.

The radiator or cooling means for the engine cylinders, if a water jacketed type of motor is used, consists of a horizontally disposed, cylindrical drum 26 supported in any preferred manner at an interval above the cylinders, as on brackets 28, and a tubular pedestal 29, the latter forming a housing for the water pipe connections (not shown) with the cylinders, and the drum having horizontal air tubes 30 therethrough. The exhaust of the engine is led through an upright pipe 31 into a stack 32 from the forward end of the drum, the exhaust thus drawing the air through the tubes 30 and cooling the drum contents.

A removable plate 33 affords access to the interior of the main frame in which the mechanism is housed. A suitable lubricating system and means for controlling the engine and other like accessories, while not shown, are provided, the details of construction following the lines of good shop practice and engineering design. The cylinders, casing and housing, which together form an integral engine frame, are of proper material and design to both house the particular arrangement of mechanism used, and afford a light, strong engine body and chassis combined, and may, if desired, be made of sheet metal.

Obviously, changes in the details of construction may be made without departing from the spirit of the invention, and I do not care to limit myself to any particular form or arrangement of parts.

What I claim as my invention is:—

1. A tractor comprising a horizontal hollow frame whose end portion constitutes the cylinders of an internal combustion motor whose running parts are housed in the frame, a pair of traction bearing wheels supporting one end of the frame, a guide bearing wheel supporting the other end, and transmission mechanism housed in the frame operatively connecting the traction wheels and the motor, the frame forming a platform body rigidly holding the wheels in spaced relation.

2. A tractor comprising a horizontal hollow main frame, a motor whose cylinders constitute a portion of the frame and whose running parts are housed in the frame, a pair of traction bearing wheels on the frame, transmission mechanism housed in the frame operatively connecting the motor and traction wheels, and a guide bearing wheel on which the frame is pivotally mounted, the frame forming a platform body rigidly holding the wheels in spaced relation.

3. A tractor comprising a horizontal hollow frame whose end portion constitutes the cylinders of an internal combustion motor whose running parts are in the frame, a pair of traction bearing wheels supporting one end of the frame, a guide bearing wheel supporting the other end, transmission mechanism in the frame operatively connecting the traction wheels and the motor, and manually operable means controlling the guide wheel, the frame forming a platform body rigidly holding the wheels in spaced relation.

4. A tractor comprising a horizontal hollow frame whose end portion constitutes the cylinders of an internal combustion motor whose running parts are housed in the frame, a pair of traction bearing wheels supporting one end of the frame, a guide bearing wheel supporting the other end, transmission mechanism in the frame operatively connecting the traction wheels and the motor, and pulleys on the motor shaft outside the frame, the frame forming a platform body rigidly holding the wheels in spaced relation.

5. A tractor comprising a horizontally-disposed hollow housing permanently closed at its rear end, alined lateral bearing brackets near the rear end thereof, a driving shaft extending through the brackets and housing, traction bearing wheels on the outer portions of the shaft, a motor crank case secured on the forward open end of the housing, an internal combustion motor whose cylinders form a horizontal longitudinal extension of the forward end of the crank case and whose main shaft is journaled between the crank case and housing parallel to the traction wheel shaft, and pilot bearing wheels supporting the cylinders.

6. A tractor comprising a horizontally-disposed hollow housing permanently closed at its rear end, alined lateral bearing brackets near the rear end thereof, a driving shaft extending through the brackets and housing, traction bearing wheels on the outer portions of the shaft, a motor crank case secured on the forward open end of the housing, an internal combustion motor whose cylinders form a horizontal longitudinal extension of the forward end of the crank case and whose main shaft is journaled between the crank case and housing parallel to the traction wheel shaft, a pivot bearing on the under side of the cylinders, an axle oscillatory in the bearing, pilot bearing wheels on the axle, a bearing on the under side of the housing, and radius rods whose outer ends are secured to the axle and whose inner convergent united ends engage the housing bearing.

7. A structure comprising a horizontally disposed hollow housing, a horizontally disposed internal combustion motor secured to the forward end of the housing as a rigid extension thereof, a pair of traction bearing wheels on which the rear portion of the housing is supported, a forward axle on which the motor is directly pivoted, pilot bearing wheels on the forward axle and a differential and change speed driving mechanism contained in the housing and adapted to operatively connect the motor and the traction wheels.

8. A tractor comprising a horizontally-disposed hollow-housing, a horizontal driving shaft extending transversely through the rear portion of the housing, traction bearing wheels operatively-mounted on the shaft, a horizontally-disposed internal combustion motor rigidly secured to the forward end of the housing as an extension thereof, a forward axle on which the motor is pivoted directly, pilot bearing wheels on the forward axle, and change speed driving mechanism in the housing operatively-connecting the driving shaft and the motor.

9. A tractor comprising a horizontally-disposed hollow housing, bearing brackets extending laterally from the rear portion thereof, a driving shaft journaled in the brackets, traction bearing wheels mounted on the extended portions of the shaft, an internal combustion motor rigidly secured to the forward end of the housing with its cylinders forming a horizontal longitudinal extension thereof, a main shaft of the motor journaled in the housing parallel to the traction wheel shaft, a forward axle on which the motor cylinders are mounted, pilot bearing wheels on the forward axle, and change speed mechanism in the housing operatively-connecting the motor and traction wheel shafts.

10. A tractor comprising a horizontally-disposed hollow casing, a drive shaft journaled transversely through the rear portion thereof, traction bearing wheels on the projecting portions of said shaft, a horizontally-disposed internal combustion motor forming a longitudinal extension from the forward end of the casing to which it is rigidly secured, a motor main shaft journaled transversely to the housing parallel to the main shaft, a forward axle on which the motor is pivotally-mounted directly, pilot bearing wheels on the axle, and change speed mechanism in the housing operatively-connecting the motor shaft and drive shafts.

11. A tractor comprising a horizontally-disposed hollow housing, a traction wheel shaft journaled transversely in the rear portion thereof, traction bearing wheels on the shaft, a motor crank case forming a hollow extension of the forward open end of the housing, a motor crank shaft journaled between the housing and crank case parallel to the traction wheel shaft, an internal combustion motor whose horizontally-disposed cylinders form a longitudinal extension of the crank case, a forward axle on which the motor cylinders are directly pivoted, and pilot bearing wheels on the axle.

12. A tractor comprising a horizontally-disposed hollow housing permanently closed at its rear end, alined lateral bearing brackets near the rear end thereof, a driving shaft extending through the brackets and housing, traction bearing wheels on the outer portions of the shaft, a motor crank case secured on the forward open end of the housing, an internal combustion motor whose cylinders form a horizontal longitudinal extension of the forward end of the crank case and whose main shaft is journaled between the crank case and housing parallel to the traction wheel shaft, a forward axle on which the motor is directly pivoted, and pilot bearing wheels on the axle.

In testimony whereof I affix my signature in presence of two witnesses.

HENRY FORD.

Witnesses:
ANNA M. SHANNON,
C. R. STICKNEY.